United States Patent
Lesyk

(10) Patent No.: US 7,540,804 B2
(45) Date of Patent: Jun. 2, 2009

(54) COMBINE CYLINDER REVERSING APPARATUS

(75) Inventor: Harvey Lesyk, Box 18, Birsay, Saskatchewan (CA) S0L 0G0

(73) Assignee: Harvey Lesyk, Birsay (CA)

( * ) Notice: Subject to any disclaimer, the term of this patent is extended or adjusted under 35 U.S.C. 154(b) by 256 days.

(21) Appl. No.: 11/503,828

(22) Filed: Aug. 14, 2006

(65) Prior Publication Data

US 2007/0082719 A1    Apr. 12, 2007

(30) Foreign Application Priority Data

Oct. 6, 2005   (CA)   ................... 2522437

(51) Int. Cl.
*A01F 12/28* (2006.01)
(52) U.S. Cl. ........................ 460/62; 460/149
(58) Field of Classification Search ............ 460/1, 460/6, 62, 149, 150
See application file for complete search history.

(56) References Cited

U.S. PATENT DOCUMENTS 6,984,171 B2 * 1/2006 Brome et al. ............. 460/59

2006/0287020 A1 * 12/2006 Muhr ........................ 460/109

* cited by examiner

*Primary Examiner*—Alicia M Torres
(74) *Attorney, Agent, or Firm*—Oppenheimer Wolff & Donnelly LLP

(57) ABSTRACT

A method of loosening crop material jammed between a cylinder and concave grate of an agricultural combine includes attaching a winch to a portion of the combine such that the winch location is fixed relative to the cylinder. An arm member is engaged with the cylinder, and a free end of the winch cable is attached to the arm member. The winch pulls the arm member toward the winch and rotates the cylinder in a reverse direction through a portion of a revolution, and then the winch is reversed to provide slack to allow disengaging the arm member from the cylinder, and reengaging the arm member at a different location to attain a suitable orientation. The winch is then again operated to rotate the cylinder in reverse through a further portion of a revolution, and steps are repeated as required to loosen the crop material.

5 Claims, 2 Drawing Sheets

COMBINE CYLINDER REVERSING APPARATUS

This invention is in the field of combines used in agriculture for harvesting crops and in particular devices to aid in clearing combine cylinders that become jammed with crop material.

BACKGROUND OF THE INVENTION

One common type of agricultural combine includes a transverse rotating cylinder with rub bars arranged on an outer surface thereof. The cylinder is mounted on a shaft and a cylinder drive typically comprises a pulley or sprocket on one end of the shaft that is driven by suitable belts, chains, or the like. The outer surface of the cylinder rotates in relatively close proximity to a concave grate located generally under the cylinder, and typically an adjustment mechanism is provided to vary the clearance between the rub bars and the grate. Typically as well, this clearance decreases from the front of the grate to the rear of the grate. The cylinder rotates in a forward direction such that the bottom thereof moves rearward, and crop material is fed from the combine's feeder mechanism into the front of the cylinder and passes between the rub bars on the cylinder and the grate to rub the desired seeds out of the crop material. The desired seeds pass through the grate and are collected in the combine while the balance of the crop material passes through the combine back onto the field.

A common problem with combines is that crop material will sometimes jam between the cylinder and the grate, causing the cylinder to stop rotating. The crop material enters the front of the grate where the clearance between the cylinder and grate is greatest, and as it moves rearward and the clearance decreases, the crop material can jam, either when the crop material is damp, or when the crop material enters in a wad or lump. The crop material must be then be cleared from the area between the cylinder and the grate before harvesting can proceed. Typically to clear the crop material, the grate is moved downward to increase the clearance between the cylinder and grate to the maximum clearance available. The cylinder is then rotated in a reverse direction such that the bottom of the cylinder moves forward with respect to the grate, and the crop material moves forward from the low clearance area at the rear of the grate to the higher clearance area at the front of the grate where it loosens and can be manually removed through an access port typically provided on the combine.

In order to rotate the cylinder in the reverse direction, combine operators typically use a lengthy bar with one end adapted such that the operator can engage the bar with the cylinder shaft directly with a wrench type end, or via the pulley or sprocket mounted on the shaft by engaging the bar in corresponding apertures spaced around the pulley or sprocket. The operator then manually exerts a force on the outer end of the bar, where leverage is maximized, to rotate the cylinder in the reverse direction. In most cases, significant force is required to rotate the cylinder. Typically the operator orients the bar, if room allows, such that same extends rearward and upward relative to the cylinder shaft, and the operator pulls down so that his weight is added to the force on the bar. Pulling downward on the bar extending rearward from the cylinder shaft exerts a force that moves the bottom of the cylinder forward in the reverse direction. Combine configurations vary greatly such that the location of the cylinder pulley often does not allow the bar to oriented conveniently and the operator is thus required to pull up or laterally on the bar, sometimes in an awkward position where it is difficult to pull effectively.

Often the operator will be unsuccessful in moving the cylinder, and then must enlist further help in order to rotate the cylinder, or attempt to dig the material out through the front end of the grate. Frustration with failed attempts to reverse the cylinder can lead the operator to take hazardous steps such as standing and jumping on the bar which can cause the bar to slip out of engagement with the cylinder and injure the operator. Often attempts are made to engage an extension on the bar to increase the leverage, however clearance is often limited. A jammed or plugged cylinder is generally regarded as one of the most distasteful occurrences a combine operator can encounter, requiring considerable time and effort to clear.

Agricultural combines are also known that have a longitudinally oriented rotor and grate, analogous to the cylinder and grate described above, and similar jamming is known to occur in these rotary type combines.

Combine feeder reversers are known comprising a motor operative to turn the feeder mechanism in a reverse direction in order to clear jammed crop material from the feeder house, however such mechanisms have not been adapted to reverse the cylinder or rotor because the force required to reverse the cylinder is much greater than that required to reverse the feeder and suitable motors and drives have not been known.

BRIEF SUMMARY OF THE INVENTION

It is an object of the present invention to provide an apparatus and method for reversing a combine cylinder to clear jammed crop material that overcomes problems in the prior art.

The present invention provides in one embodiment, a method of loosening crop material jammed between a cylinder and concave grate of an agricultural combine. The method comprises attaching a winch to a portion of the combine such that the winch location is fixed relative to the cylinder, and winding a winch cable onto the winch; engaging an arm member with the cylinder; attaching a free end of the winch cable to the arm member; operating the winch to pull the arm member toward the winch and rotate the cylinder in a reverse direction through a portion of a revolution; operating the winch in a reverse direction to provide slack in the winch cable; disengaging the arm member from the cylinder, and reengaging the arm member with the cylinder at a different location to attain a suitable orientation; operating the winch to rotate the cylinder in the reverse direction through a further portion of a revolution; and repeating steps as required to loosen the crop material.

The orientation of the cylinder, arm member, attachment location of the free end of the winch cable to the arm member, and winch is such that operating the winch in a forward direction winds the cable onto the winch and pulls the arm member toward the winch, rotating the cylinder in a reverse direction through a portion of a revolution. The winch is then operated in the reverse direction to provide slack in the winch cable, the arm member is disengaged from the cylinder, and reengaged at a different location to attain the proper orientation, and the winch is again operated in the forward direction to rotate the cylinder in a reverse direction through a further portion of a revolution. The process is repeated as often as necessary to allow conventional clearing methods to be used to complete the clearing operation and allow harvesting to proceed.

Thus the present invention provides sufficient force to rotate the cylinder in the reverse direction. Typically moving the cylinder only a fairly short distance in the reverse direction will move the crop material jammed in the lower clearance area near the rear of the grate forward into a higher clearance area where the material will be looser and conventional clearing methods can be used to complete the operation.

BRIEF DESCRIPTION OF THE DRAWINGS

While the invention is claimed in the concluding portions hereof, preferred embodiments are provided in the accompanying detailed description which may be best understood in conjunction with the accompanying diagrams where like parts in each of the several diagrams are labeled with like numbers, and where:

DETAILED DESCRIPTION OF THE INVENTION

Figure 1:
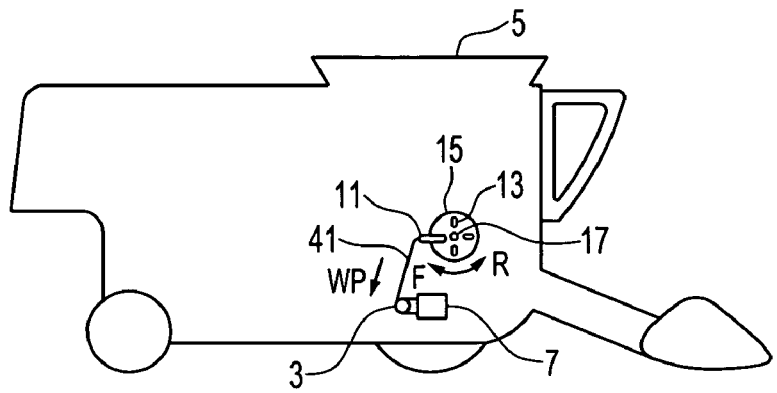
FIG. 1 is a schematic side view of a combine showing the apparatus of the present invention in use to rotate the combine cylinder in a reverse direction.

FIG. 1 schematically illustrates the method of the present invention for reversing a combine cylinder to loosen and clear jammed crop material. The method is shown on a conventional agricultural combine with a rotating cylinder oriented laterally with respect to the travel direction of the combine. Those skilled in the art will recognize that the same method could be used in a rotary combine where the cylinder or rotor is oriented substantially aligned with the travel direction.

The method comprises attaching a winch 3 to a portion of the combine 5 such that the winch location is fixed relative to the cylinder. The embodiment illustrated in FIG. 1 shows the winch 3 attached by clamps, welding, or like means to a rear face of the front axle 7. The large drive wheel mounted to the front axle 7 is removed for illustration purposes. The axle 7 provides a convenient sturdy location for the winch 3 in a combine configured approximately as shown, however other suitable locations on various combines will be apparent to those skilled in the art.

An arm member 11 is engaged with the cylinder by engaging an aperture 13 in a pulley 15 attached to the cylinder shaft 17. The arm member 11 is much shorter than the bars conventionally used to manually reverse a combine cylinder, and extends only a short distance past the outer periphery of the cylinder pulley 15. The length in a conventional bar is required in order to get sufficient leverage to reverse a jammed cylinder, however in the present invention, a winch is attached as described below, and so the arm member 11 can be short enough to allow same to engage the cylinder pulley 15 in the required orientation where a longer bar would be obstructed.

Figure 2:
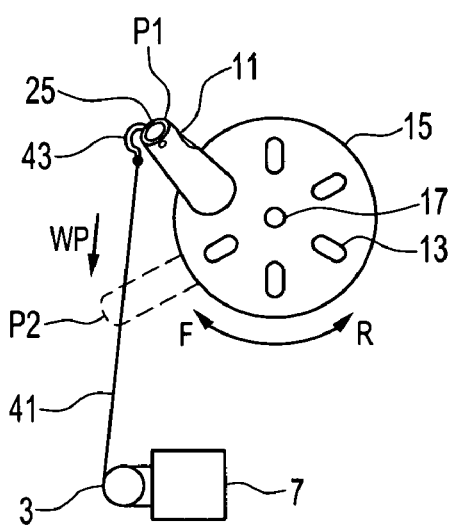
FIG. 2 is a schematic side view showing the arm member engaged in the cylinder pulley, and winch attached to the end of the handle of the arm member.

FIG. 2 illustrates the arm 11 engaging the apertures 13 in the pulley 15. This type of pulley 15 with apertures 13 is provided for example on John Deere™ 9500 and 9600 combines. Conventionally, a bar is engaged in the apertures 13 to manually rotate the pulley 15 and cylinder shaft 17 in reverse to clear jammed crop material. Because of obstructions from the combine configuration, the bar in these combines must be oriented forward of the cylinder pulley 15, such that same must be pushed upward to reverse the cylinder.

FIGS. 5-8 illustrate an arm member 11 that can be used in the present invention to engage the apertures 13. Knob 19 projects from the side of the arm handle 21 and into the aperture 13. The knob 19 is inserted such that a lug 23 slips into the aperture 13 and engages the inner face of the pulley 15 to prevent the knob 19 from slipping out of the aperture 13. A hook aperture 25 is defined by a chain link welded to the end of the handle 21 for engagement of a winch cable as discussed below.

As seen in FIG. 2, a winch cable 41 is wound on the winch 3 and a free end of the winch cable is attached to the arm member 11. In the illustrated embodiment, a hook 43 is attached to the free end of the winch cable 41 and engaged in the hook aperture 25 on the end of the arm member 11. The orientation of the cylinder pulley 15, arm member 11, attachment location of the free end of the winch cable 41 to the arm member at hook aperture 25, and winch 3 is illustrated in FIG. 2, and is such that operating the winch 3 in a pulling direction WP winds the cable 41 onto the winch 3 and pulls the arm member 11 toward the winch 3, rotating the cylinder pulley 15 in a reverse direction R through a portion of a revolution. The arm member 11 is pulled from position P1 to position P2, at which point the winch 3 is then operated in the opposite direction to unwind the cable 41 from the winch 41 and provide slack in the winch cable 41. The arm member 11 is disengaged from the cylinder pulley 15, and reengaged in a different aperture 13 at a suitable location to again attain the proper orientation about at P1, and the winch 3 is again operated in the pulling direction WP to rotate the cylinder in a reverse direction through a further portion of a revolution. The process is repeated as often as necessary to loosen the jammed material and allow conventional clearing methods to be used to complete the clearing operation and allow harvesting to proceed.

Figure 3:
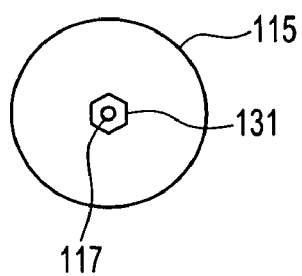
FIG. 3 is a schematic side view of an alternate cylinder pulley with a hex head on the shaft thereof such as can be found on combines.
Figure 4:
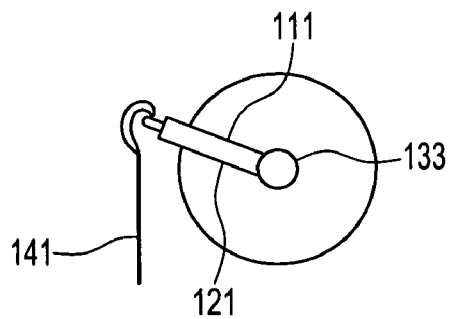
FIG. 4 is a schematic side view of an alternate arm member in use on the pulley of FIG. 3.
Figure 5:
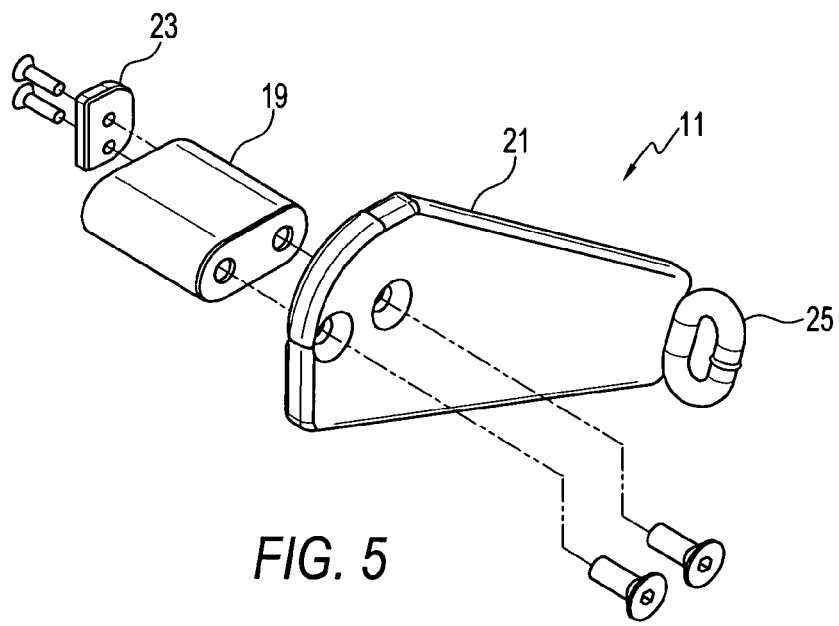
FIG. 5 is a perspective exploded view of the arm member of FIG. 1.
Figure 6:
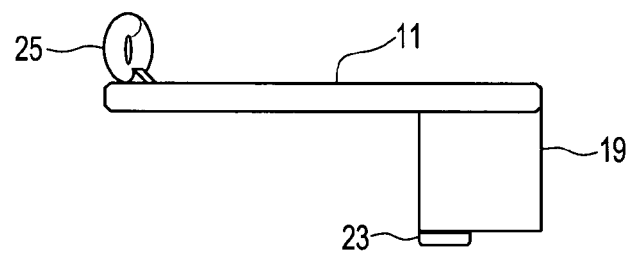
FIG. 6 is a top view of the arm member of FIG. 1.
Figure 7:
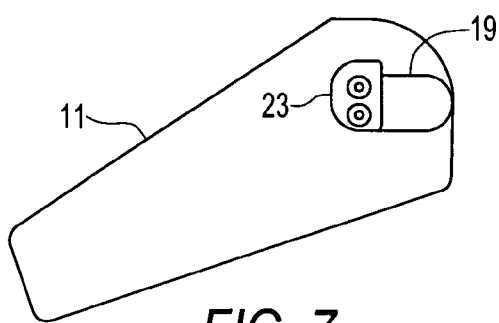
FIG. 7 is a side view of the arm member of FIG. 1.
Figure 8:
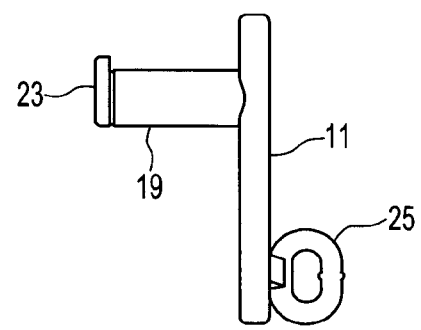
FIG. 8 is an end view of the arm member of FIG. 1.

An alternate pulley 115 is illustrated in FIG. 3 comprising a hex head 131 defined around the cylinder shaft 117. The pulley 115 is an example of a pulley and shaft that is sometimes used on a combine cylinder. For use with such a pulley 115, an arm member 111 comprises a socket wrench head 133 configured to engage the hex head 131. The wrench head 133 is attached to a handle 121 and a hook aperture 125 is defined in the end of the handle 121 for engagement of a winch cable 141. It will be understood by those skilled in the art that combine cylinders are made in various configurations and the arm member can be adapted to engage the cylinder in a variety of ways.

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

What is claimed is:

1. A method of loosening crop material jammed between a cylinder and concave grate of an agricultural combine, the method comprising:

attaching a winch to a portion of the combine such that the winch location is fixed relative to the cylinder, and winding a winch cable onto the winch;

engaging an arm member with the cylinder;
attaching a free end of the winch cable to the arm member;
operating the winch to pull the arm member toward the winch and rotate the cylinder in a reverse direction through a portion of a revolution;
operating the winch in a reverse direction to provide slack in the winch cable;
disengaging the arm member from the cylinder, and reengaging the arm member with the cylinder at a different location to attain a suitable orientation;
operating the winch to rotate the cylinder in the reverse direction through a further portion of a revolution;
repeating steps as required to loosen the crop material;
wherein a drive element is attached to the end of a shaft of the cylinder, and wherein the arm member is engaged in an aperture in the drive element.

2. The method of claim 1 wherein the arm member comprises a knob projecting laterally from a handle of the arm member, and wherein the arm member is engaged in the aperture in the drive element by inserting the knob into the aperture.

3. The method of claim 2 wherein the arm member further comprises a lug extending laterally from an end of the knob opposite the handle, and wherein the knob is inserted into the aperture in the drive element such that the lug slips into the aperture and engages an inner face of the drive element to prevent the knob from slipping out of the aperture.

4. A method of loosening crop material jammed between a cylinder and concave grate of an agricultural combine, the method comprising:
attaching a winch to a portion of the combine such that the winch location is fixed relative to the cylinder, and winding a winch cable onto the winch;
engaging an arm member with the cylinder;
attaching a free end of the winch cable to the arm member;
operating the winch to pull the arm member toward the winch and rotate the cylinder in a reverse direction through a portion of a revolution;
operating the winch in a reverse direction to provide slack in the winch cable;
disengaging the arm member from the cylinder, and reengaging the arm member with the cylinder at a different location to attain a suitable orientation;
operating the winch to rotate the cylinder in the reverse direction through a further portion of a revolution;
repeating steps as required to loosen the crop material;
wherein the arm engages an end of a shaft of the cylinder.

5. A method of loosening crop material jammed between a cylinder and concave grate of an agricultural combine, the method comprising:
attaching a winch to a portion of the combine such that the winch location is fixed relative to the cylinder, and winding a winch cable onto the winch;
engaging an arm member with the cylinder;
attaching a free end of the winch cable to the arm member;
operating the winch to pull the arm member toward the winch and rotate the cylinder in a reverse direction through a portion of a revolution;
operating the winch in a reverse direction to provide slack in the winch cable;
disengaging the arm member from the cylinder, and reengaging the arm member with the cylinder at a different location to attain a suitable orientation;
operating the winch to rotate the cylinder in the reverse direction through a further portion of a revolution;
repeating steps as required to loosen the crop material;
wherein an end of the arm member is configured as a wrench socket to engage the cylinder.

\* \* \* \* \*